United States Patent [19]

Marche

[11] Patent Number: 4,475,814
[45] Date of Patent: Oct. 9, 1984

[54] DEVICE FOR DETERMINING THE SPATIAL POSITION OF AN OBJECT

[75] Inventor: Pierre Marche, Boulogne Billancourt, France

[73] Assignee: U.S. Philips Corp., New York, N.Y.

[21] Appl. No.: 282,356

[22] Filed: Jul. 13, 1981

[30] Foreign Application Priority Data

Jul. 18, 1980 [FR] France ............................. 80 15868

[51] Int. Cl.³ ........................................... G02C 1/00
[52] U.S. Cl. .................................. 356/138; 356/152; 356/367; 356/375
[58] Field of Search ............... 356/138, 152, 364, 367, 356/375; 250/225, 236

[56] References Cited

U.S. PATENT DOCUMENTS

| | | | |
|---|---|---|---|
| 3,867,629 | 2/1975 | Van Buskirk | 356/368 |
| 3,871,771 | 3/1975 | Scott | 356/138 |
| 3,917,412 | 11/1975 | Stoutmeyer | 356/152 |
| 3,932,039 | 1/1976 | Frey | 356/138 |
| 4,111,555 | 9/1978 | Ellis | 356/152 |
| 4,193,689 | 3/1980 | Reymond et al. | 356/152 |

Primary Examiner—R. A. Rosenberger
Attorney, Agent, or Firm—Robert J. Kraus

[57] ABSTRACT

A device for determining the spatial position of an object (11) including a plurality of sources (A1, A2, B1, B2, C) emitting beams of the polarized light in different directions and disposed on the object and a plurality of stationary detection devices (21, 22, 23), each having means for measuring the angular orientation of the direction of polarization of a beam of polarized light which they receive relative to a corresponding reference direction. At least two of the sources (A1, B1) emit beams having distinguishable characteristics, but the same direction of polarization, and are arranged so close to each other that a specific detection device (22) always receives at least one or the other of the beams. Means associated with the detection device distinguishes the beams from each other as a function of the characteristics.

5 Claims, 3 Drawing Figures

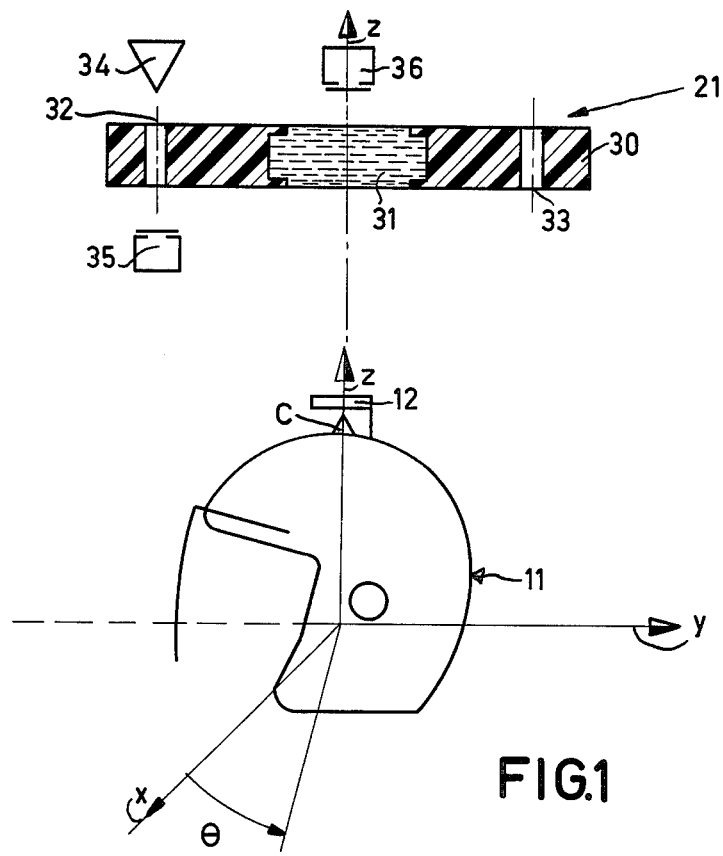
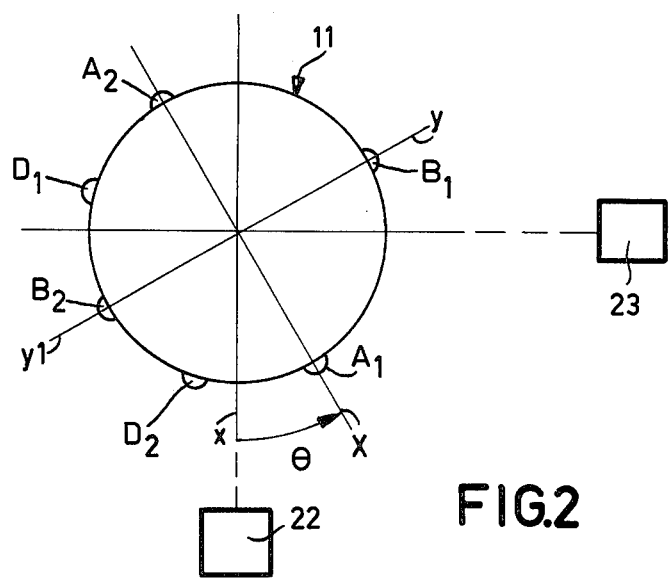
FIG.1
FIG.2

DEVICE FOR DETERMINING THE SPATIAL POSITION OF AN OBJECT

BACKGROUND OF THE INVENTION

The invention relates to a device for remotely determining the spatial position of a rotatable object. The movement of the object relative to a fixed trihedral reference frame is resolved into rotational components.

Such positional determinations are especially useful in applications where variations in the orientation of the head of a pilot of an aircraft relative to the cockpit should be followed, for example in order to obtain an indication of said movements for a subsequent study or in order to provide automatic control in accordance with changes in the pilot's line of sight. For this type of applications the fixed reference frame is represented by the cockpit and the movable object in the space of said cockpit is generally constituted by the helmet on the pilot's head, which helmet moves in accordance with the direction of visual observation of the pilot.

Devices are known which have been designed in order to enable the angular position of the pilot's line of sight to be determined by remote measuring means, without any mechanical linkage between the pilot's helmet and the cockpit and employing polarized light. Such a device is described in U.S. Pat. No. 3,867,629. The pilot's helmet is provided with a reflector and a polarizer, which together constitute a source of polarized light, the direction of the polarizing vector varying with the angular position of the helmet relative to the axis of propagation of the beam. Said beam is directed at a device for detecting the angular position of the polarizing vector, which device comprises a rotating analyser and an optical sensor. Said sensor is sensitive to the luminous intensity of the beam which it receives via the analyser, which analyzer is mounted on a rotary disc which is perpendicular to the axis of propagation of the beam. This detection device is stationary with respect to the object being observed. For the specific use considered the disc carrying the analyser is rotatably mounted on the cockpit and the optical sensor is rigidly connected to said cockpit behind the analyser. This means that the direction of the beam should remain fixed. Measuring is effected by determining the angle through which the disc has rotated from an angular reference position when a maximum light transmission through the analyser indicates the coincidence of its direction of polarization with that of the light beam from the helmet, said last-mentioned direction, being related, as already set forth, to the angular position of the helmet relative to the axis of propagation of the beam.

British Patent Specification No. 1,045,994 discloses how, in a device of the same type, variations in luminous intensity as a function of the angular distance existing at any instant between the analyser and the polarizer may be used in a differential measurement. A polariser mounted on the pilot's helmet cooperates with a system comprising a plurality of analysers mounted on one and the same rotary disc with differently oriented polarizing axes. The system is made to rotate around the light beam, its angular position being referred to the cockpit until the luminous intensities of the beams transmitted by the differently oriented analysers are equal. As in the system described in the previously mentioned U.S. patent, observation is limited to rotational movements of the helmet about a single axis, which is fixed relative to the cockpit, in accordance with which axis the light beam used for the measurements propagates.

SUMMARY OF THE INVENTION

It is an object of the present invention to obtain a substantial extension of the use of known devices. In order to reach such a goal, it does not suffice to combine devices as described in the prior-art documents. Although an arbitrary rotational movement can be resolved into three elementary rotational movements about the three axes of, for example, a trirectangular reference frame, problems remain to be solved. First, the three rotational components cannot be treated separately. Second, the measurable characteristics of each of them depend on the values observed for the previous ones and on the selected reference direction. Third, an arbitrary rotational movement in space does not have any fixed direction in which the beam used in the known devices can be directed. It is another object of the invention that the measurements of a rotation in space be effected relative to a three-dimensional reference frame by very simple means having a high reliability of operation, which is particularly useful in devices intended for mounting in aircraft.

To achieve these objects, the device according to the invention, comprises a plurality of polarized-light sources whose beams are oriented in different directions. The sources are disposed on the object whose rotational position in space is to be determined, for example a pilot's helmet. The device further comprises a plurality of associated stationary detection devices, which are for example connected to the pilot's aircraft cockpit. Each of said detection devices may be similar to as those used in either of the above-identified prior-art arrangements or to any other device which enables determination of the angular orientation of the direction of polarization of a polarized-light beam which it receives relative to a reference direction. During movements of the object being examined, one detection device can thus receive beams from different sources attached to the object at different instants. The different beams are distinguished by the characteristics of the light of said beams, which are not affected by the movements of the object. In this respect it is advantageous if the polarized light is emitted in the form of periodic pulses, which are shifted in time for the different sources.

In accordance with the invention, the device comprises a plurality of sources which emit beams of polarized light in different directions and are disposed on the object and a plurality of stationary detection devices, each comprising means for measuring the angular orientation of the direction of polarization of a beam of polarized light which it receives relative to an associated reference direction. At least two of said sources emitting beams have the same direction of polarization and are arranged in such a way relative to each other that a specific detection device permanently receives at least the one or the other of the beams of said two sources. Means are associated with said detection device for distinguishing the beams from each other as a function of the characteristics of the light, which are independent of the orientation of the light, and for selecting the beam to which each measurement relates.

It should be appreciated that in the foregoing the detection devices which are said to be stationary are stationary only relative to the object. Furthermore, said devices, which are known per se, generally comprise a rotating analyser, which is mounted for rotation about a fixed axis and the angular orientation which is determined is that of the direction of polarization which rotates about said axis depending on the rotational movements of the object. It should also be appreciated that, generally speaking, complete measurements for an object whose orientation may vary in all directions requires three angular measurements, by means of three stationary detection devices defining a fixed trihedral reference frame. In practice, this is suitably a trirectangular trihedral, relative to which the position of a similar trirectangular trihedral, which is rigidly connected to the object is to be defined. The sources disposed on an object then suitably comprise at least a first source on an axis which is perpendicular to a plane containing a series of sources radiating in said plane and being regularly spaced around said axis at angular distances which are sufficiently small to ensure that each of the two stationary detection devices permanently receives one of the beams emitted by said series of sources. All the beams emitted by the sources of said series have a direction of polarization which is perpendicular to the plane in which said sources are disposed. For example, if for the radiation sources use is made of light-emitting diodes whose beams, after having traversed an associated polarizer which is rigidly connected to the object, cover a solid angle of 90°, it suffices to use four diodes spaced at 90° from each other in one plane in order to guarantee that the detection devices can follow the rotational movements of the object about the perpendicular axis.

For most practical uses and in particular those which concern the determination of rotational movements of the head of a pilot in an aircraft, it is necessary that there is also provided a series of sources emitting in the direction of the third detection device, in accordance with the axis which is perpendicular to the plane containing the aforementioned series of sources. Indeed, in practice the rotational movements to be observed remain within limited ranges around certain axes of the trirectangular trihedral. It may then be advantageous to select the plane of the series of diodes so that it is perpendicular to the axis about which the rotations are most complete. Then it suffices to use a single source on said axis when the components of the rotation about the other axes normally remain within such limits that the beam emitted by the said single source is permanently incident on the associated stationary detection device.

For example, for determining the position of the head of a pilot, it may generally be assumed that the azimuth varies over the widest angular range, whilst the angle of sight hardly varies more than 60° to both sides of the rest position, and the angle of roll even to a smaller extent. Furthermore, in the final measurement results the angle of sight and the azimuth are of primary interest, but the determination of the angle of roll is useful in various data-processing operations by means of which the rotation expressed in the azimuth angle and angle of sight can be derived effectively from the measuring results, which initially yield the angles of rotation about the axes of the movable trihedral associated with the object, through the orientations of the directions of polarization about the axes of propagation of the detected light beams.

Suitably, the light sources which are used are controlled so that the effective intensity, through each polarizer, is emitted in the form of periodic pulses, the pulses from each source being shifted in time relative to those from the other sources. In combination with this arrangement, the device in accordance with the invention is adapted to process the results of measurements of the angular orientation of the directions of polarization differently depending on whether the measurement, which at a specific instant is effected by a detection device, relates to the one or the other of the polarized beams which may be incident on it. A distinction can easily be made in accordance with the shift of the pulses. Naturally, said shift, as well as the pulse width, should be small relative to the time intervals between successive pulses.

It is to be noted that in the preferred embodiment of the invention, the polarized beams emitted by sources in one plane with the same direction of polarization, are interchangeable up to the final determination of the three angles which define the orientation of the object in space, and that consequently each detection device may be used for measuring a specific angle and always plays the same part in the calculations, regardless of the beam which it detects. It suffices that at each instant the signals are processed in such a way that for each detection device only a single beam, which differs for each device, is taken into account. The signals relating to different sources may be separated in accordance with the shift of the pulses and for further processing the signal having the highest amplitude may be selected. It should also be noted that the various angular measurements are not influenced by any translatory movements of the object.

BRIEF DESCRIPTION OF THE DRAWING

The device in accordance with the invention may have various other characteristic features, which will become apparent from the following description, which relates to a particular embodiment of the device, which is chosen by way of non-limitative example. Said description refers to FIGS. 1 to 3 of the accompanying drawings, in which:

FIG. 1 schematically represents the device, in a longitudinal plane in which a source and an associated detection device are disposed;

FIG. 2 schematically represents the same device in a transverse plane in which a series of sources and two detection devices are disposed;

DESCRIPTION OF THE PREFERRED EMBODIMENT

Figure 3:
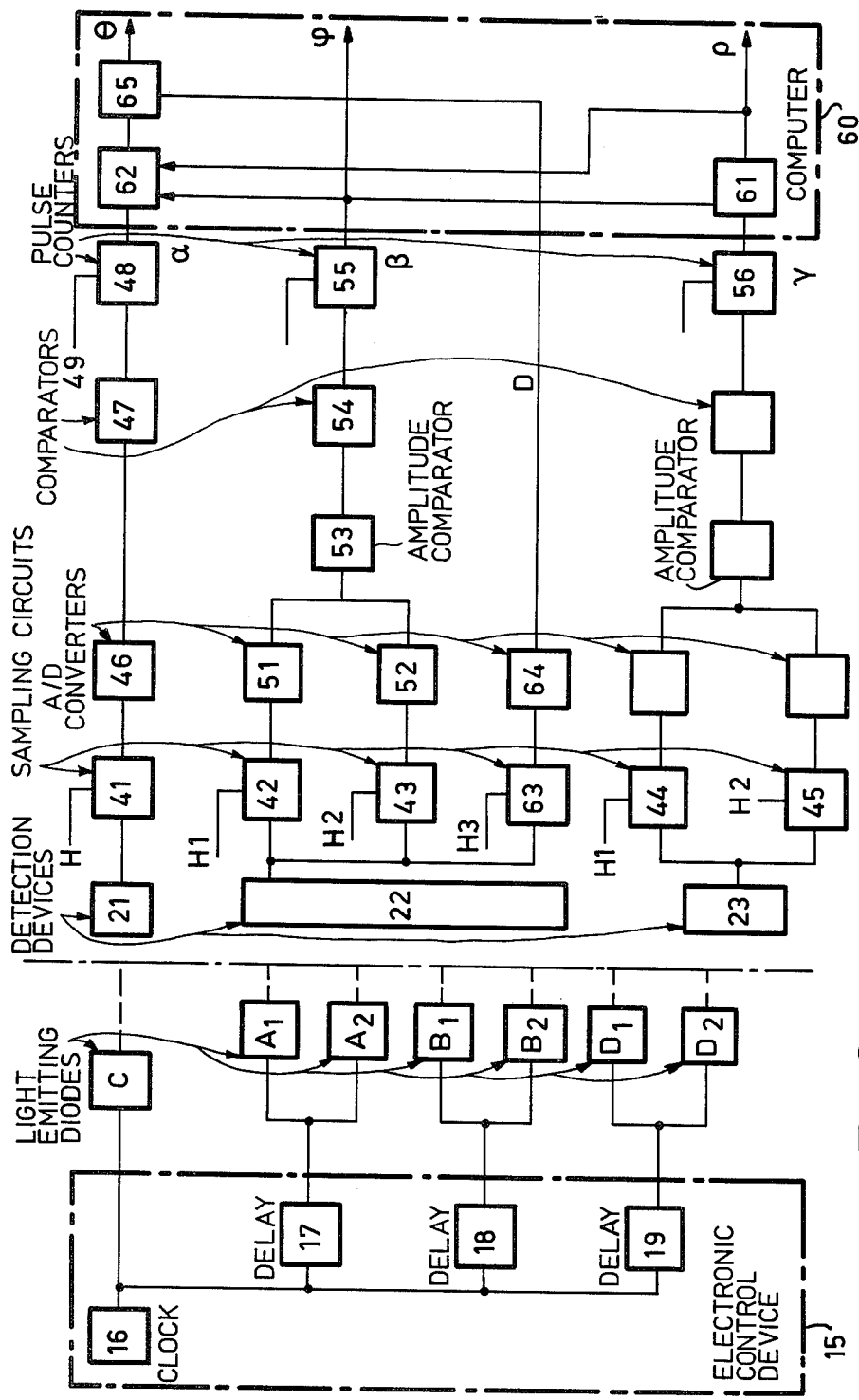
FIG. 3 is a block diagram of the electronic control and measurement-result processing circuits.

In the particular embodiment described, the device is mounted in an aircraft and is adapted to measure at any instant the position of the pilot's line of sight, expressed as an angle of sight $\phi$ and an azimuth angle $\theta$ relative to a fixed reference frame connected to the aircraft. The movements of the head are in fact defined by three rotational movements expressed as angles of azimuth, sight, and roll respectively, that is $\theta$, $\phi$ and $\rho$, which are defined by the position of an orthonormal reference frame OXYZ, associated with the pilot, relative to a fixed reference frame Oxyz, associated with the aircraft cockpit. It is assumed that in practice the movements of the head are such that the aximuth $\theta$ may vary between $-120°$ and $120°$, or even through a complete circle between $-180°$ and $+180°$ on both sides of the longitudinal axis of the aircraft, whilst the sight and roll components of the rotation each remain within an angle of 90 degrees from the rest position in which the component is zero.

In FIG. 1 the position of the pilot's head is represented by the position of his helmet 11 when he is in an initial or rest position, in which all the components of the rotation are zero, the head being perpendicular to the vertical axis Oz and facing the front of the aircraft along the longitudinal axis, opposite to the axis Oy. The angle $\theta$ is also shown, which represents the azimuth of the line of sight when the pilot turns his head, for example, to the left, keeping it straight.

The same angle $\theta$ is found in the plan view of FIG. 2, between the axis Ox of the fixed reference frame and the axis OX of the helmet.

On the helmet 11 various light-emitting diodes are arranged on the axes of the movable reference frame. In front of each of them there is arranged a polarizer, which is also rigidly connected to the helmet 11, such as the polarizer 12, which is shown in FIG. 1 in front of the diode C disposed on the top of the helmet. Together with an associated polarizer each diode constitutes a source of polarized light. Such a source may also be formed in any other known manner. In the particular case described, the emission cone of each source covers a solid angle of approximately 90 degrees whose axis is situated on the radius of the helmet which passes through the diode.

There are provided at least five sources thus arranged on the helmet. The first one is that already mentioned with reference to FIG. 1, whose diode C is disposed at the top of the helmet. Four others are arranged in the plane perpendicular to the axis through the diode C. These are the diodes A1, B1, A2, B2 of FIG. 2, which are regularly spaced at 90 degrees from each other. The corresponding beams radiated from the helmet each cover a solid angle which may be estimated at approximately 90 degrees.

In the special case described, there are also provided two further diodes D1 and D2 in the same plane, which are disposed on the line of sight OY' at 45 degrees on both sides of the diode B2. In order to simplify the measuring operations and the processing of the results yielding the desired angles, the polarization vectors of the beams emitted in the plane OXY are all parallel to each other and are oriented perpendicularly to said plan, in accordance with the axis OZ, whilst the polarization vector of the beam emitted by the diode C is parallel to the plane OXY, and is specifically oriented in accordance with OX.

Associated with the array of diodes on the helmet is an electronic control device 15 (FIG. 3), which supplies a drive current with periodic pulses to these diodes. The frequency is the same for all the diodes, but the pulses from the different diodes are shifted by a small fraction of a period relative to each other, except for the diametrically opposed diodes which are driven simultaneously, A1 and A2 on the one hand and B1 and B2 on the other hand. By way of example, the clock 16 supplies control pulses having a frequency of 30 kHz, which are sequentially transferred to the diode C without delay, to the diodes A1 and A2 with a delay introduced at 17, to the diodes B1 and B2 with a double delay introduced at 18, and to the diodes D1 and D2 with a triple delay introduced at 19.

Furthermore, on the cockpit, the device comprises three electro-optical detection devices for the polarized beams, which devices are associated with the fixed reference frame and are respectively disposed on the axes Ox, Oy and Oz. The detection device 21, which is disposed above the pilot in order to receive the beam radiated from the diode C, is shown in FIG. 1. The two other detection devices are referenced 22 and 23 in FIG. 2, but are not shown in more detail. They are identical to the device 21, each being disposed on the appropriate axis.

As is shown in FIG. 1, the detection device 21 comprises a disc 30, which is mounted for rotation about its own axis, which is fixed in accordance with the axis Oz of the reference frame. The central portion of the disc is constituted by an analyser 31, whilst the annular peripheral portion is formed with two apertures 32 and 33, which are diametrically opposed in accordance with the direction of polarization of the analyser. On the axis of the disc 30 a photodiode 36 detects the intensity of the luminous flux which it receives via the analyser 31. A light-emitting diode 34 and a photo-detector diode 35 are disposed on opposite sides of the disc 30, at the location of the annular peripheral portion. The diode 35 detects the luminous flux from the light-emitting diode 34, whilst as the disc rotates each of the two apertures 32 and 33 passes between them. Thus, upon each half revolution of the disc, a fixed reference orientation in time is obtained for the direction of polarization of the analyser 31. This reference orientation is that of the axis Oy in the case of FIG. 1. It is parallel to the axis Oz for the detection devices 22 and 23. The speed of rotation of the discs is constant and for example fixed at 30 revolutions per second.

The angle $\alpha$ which the polarization vector of the incident beam makes with the fixed reference orientation is defined by the orientation of the disc at the instant at which a maximum intensity of the luminous flux transmitted by the analyser indicates that the polarization vectors of the beam and the analyzer are parallel. In fact, for reasons of detection accuracy, it is preferred to detect the minimum. This means a comparison between the detected fluxes for successive pulses in the emitted beam. This comparison is effected by an electronic processor for the signals supplied by the various detection devices, which processor also effects sampling and computation of the angles.

This arrangement is described with reference to the block diagram shown in FIG. 3. Three circuits respectively serve for calculating the angles $\alpha$, $\beta$ and $\gamma$ between the fixed reference frame Oxyz and the reference frame OXYZ of the helmet on which the light-emitting diodes are arranged. Sampling circuits 41 to 45 supply the signals obtained from the detection devices to the three processing circuits in accordance with the time delay of the pulses. Thus, they receive the clock signals H, H1 and H2, H being synchronized with the control signal of the diode C, H1 with that of the diodes A1 and A2, and H2 with that of the diodes B1 and B2. Each sampled signal is transferred to an analog-to-digital converter, such as 46, for the circuit corresponding to the diode C, subsequently to a comparator, such as 47, which receives the information corresponding to the minimum flux that is detected. The signal is then transferred from the comparator 47 to a pulse counter 48, which operates with a frequency which is substantially higher than that of the signals which control the drive of the diodes the sampling, and which is reset to zero by the signal 49, which is supplied by the electro-optical detection device for the information which provides the reference orientation of the polarization vector.

For the angles $\beta$ and $\gamma$, the signal coming from the detection devices 22 and 23 normally contains information on two beams from one of the diodes A1 or A2 and one from the diodes B1 or B2, between which a distinction is to be made. To this end, the conversion into digital signals is effected by 51 and 52, both for the signal sampled on the clock signal H1 and for the signal sampled on the clock signal H2. An amplitude comparator 53 selects that signal which has the highest amplitude and corresponds to the diode nearest the axis of the detection device in order to transmit it to the following circuits. The minimum is found by means of the comparator 54, and the pulse counter 55 supplies the value of the angular orientation of the polarization vector relative to the reference orientation. Regardless of the source of origin A1, A2, B1 or B2, the beams sampled on H1 and H2 are interchangeable in the measurements and the subsequent calculations. The value found at 55 through detection by the device is assigned to the angle $\beta$. The circuits associated with the detection device 23 are formed in a similar way and the value supplied by the pulse counter 58 is assigned to the angle $\alpha$.

The information representing the values of the angles $\alpha$, $\beta$ and $\gamma$ is subsequently processed in the computer 60 for deriving the values of the azimuth angle $\theta$, the angle of sight $\phi$ and the angle of roll $\rho$. In the present example, it is desired to determine the value of the angle of sight $\phi$ with the greatest accuracy. Its value is therefore calculated first and is directly constituted by $\beta$, whilst $\rho$ is derived from $\phi$ and $\gamma$ at 61 and the azimuth $\theta$ is derived, at 62, not only from $\alpha$ but also from $\phi$ and $\rho$. The equations used are standard equations and are as follows:

$$\phi = \beta$$

$$\rho = \text{Arc tan} (\cos \phi \tan \gamma)$$

$$\theta = \text{Arc tan} \left( \frac{\cos \rho}{\cos \phi} \tan \alpha + \sin \rho \tan \phi \right)$$

The azimuth $\theta$ is thus defined, except for $\pi$, whilst it may vary to a greater extent without consequent loss of information at the detection devices 22 and 23. These devices receive the beams from the diodes D1 and D2, in order to enable a different sign to be attributed to the angle $\theta$ depending on its direction relative to the reference direction, and to enable it to be thus defined at 65, except for $2\pi$. To this end, the detection signal of the device 22 is sampled at 63 on a clock signal H3 in synchronism with the control pulses for the diodes D1 and D2, and the circuit 64 converts the absence or presence of a corresponding illumination into a binary signal D, which is applied to the circuit 65 of the computer 60, which defines the sign of the angle $\theta$. In the case described, the arrangement of the diodes D1 and D2 in conjunction with their emission angle ensures that the device 22 is illuminated by the one or the other diode when $\theta$ is positive from 0 to 180 degrees.

What is claimed is:

1. Apparatus for sensing the orientation of an object having a limited range of motion about each axis of a triaxial coordinate system, said apparatus comprising:
   (a) first, second and third detection devices disposed on respective ones of the coordinate system axes for receiving light from the direction of the object, each device including means for measuring an angle of polarization of received light with respect to the respective axis;
   (b) polarized light sources disposed on the object including:
      (1) a first light source arranged to effect continuous illumination of the first detection device over the limited range of motion of the object;
      (2) a plurality of light sources, each arranged to effect illumination of at least one of the second and third detection devices over at least a part of the limited range of motion of the object, a first and second one of said plurality of light sources being arranged to collectively effect continuous illumination of the second detection device, over the limited range of motion of the object;
   (c) means associated with the plurality of sources for effecting production of individual light characteristics, independent of light source orientation, enabling distinction between light from different ones of the plurality of light sources; and
   (d) means associated with the detection devices for distinguishing between light from different ones of the light sources.

2. Apparatus as in claim 1 characterized in that said first source is disposed on a first axis of the object and said plurality of sources are disposed in a plane perpendicular to said first axis of the object.

3. Apparatus as in claim 2 characterized in that the light sources disposed in said plane are adapted for emitting light polarized in a direction perpendicular to said plane.

4. Apparatus as in claim 1, 2 or 3 characterized in that said means associated with the light sources effects periodic pulsing of the light from the first and second ones of the plurality of light sources, the light pulses from said sources being shifted in time relative to each other, and characterized in that the means associated with the detection devices effects light detection in synchronism with the light pulses produced by said light sources.

5. Apparatus as in claim 2 or 3 characterized in that the sources in said plane comprise four sources spaced 90° apart around said axis of the object.

* * * * *